United States Patent
Jhoney et al.

(10) Patent No.: US 9,600,300 B2
(45) Date of Patent: *Mar. 21, 2017

(54) METHOD TO GENERATE DYNAMIC CUSTOMIZED CONTEXT-SENSITIVE HELP

(71) Applicant: International Business Machines Corporation, Armonk, NY (US)

(72) Inventors: Albee Jhoney, Bangalore (IN); Gaurav Nigam, Kanpur (IN); Arun Ramakrishnan, Chennai (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/474,622

(22) Filed: Sep. 2, 2014

(65) Prior Publication Data

US 2015/0067645 A1    Mar. 5, 2015

Related U.S. Application Data

(63) Continuation of application No. 14/012,181, filed on Aug. 28, 2013.

(51) Int. Cl.
*G06F 9/44*    (2006.01)

(52) U.S. Cl.
CPC .............. *G06F 9/4446* (2013.01); *G06F 8/73* (2013.01)

(58) Field of Classification Search
CPC .................................. G06F 9/4446; G06F 8/73
See application file for complete search history.

(56) References Cited

U.S. PATENT DOCUMENTS

| | | | |
|---|---|---|---|
| 6,246,404 B1 | 6/2001 | Feigner et al. | |
| 6,452,607 B1 | 9/2002 | Livingston | |
| 6,996,801 B2* | 2/2006 | Yoneyama | ............ G06F 9/4428 717/107 |
| 7,543,232 B2 | 6/2009 | Easton, Jr. et al. | |
| 7,685,570 B2* | 3/2010 | Draine | ................ G06F 11/3664 715/715 |

(Continued)

FOREIGN PATENT DOCUMENTS

| | | |
|---|---|---|
| WO | 2013077846 A1 | 5/2013 |
| WO | 2015027844 A1 | 3/2015 |

OTHER PUBLICATIONS

Lee, W., "?": A context-sensitive help system based on hypertext, Proceedings of the 24th ACM/IEEE Design Automation Conference, 1987, pp. 429-435, [retrieved on Jun. 23, 2016], Retrieved from the Internet: <URL:http://dl.acm.org/>.*

(Continued)

*Primary Examiner* — Geoffrey St Leger
(74) *Attorney, Agent, or Firm* — Noah A. Sharkan (57) ABSTRACT

Embodiments of the present invention disclose a method, computer program product, and system for customizing help screens. A computer receives a request for help content. The computer identifies an annotated help file that corresponds to the request for help content. The computer identifies one or more variables in the identified annotated help file. The computer retrieves a value for each of the one or more variables from a software product. The computer replaces each of the one or more variables in the identified annotated help file with the retrieved value to generate customized help content.

8 Claims, 5 Drawing Sheets

(56) References Cited

U.S. PATENT DOCUMENTS

| | | | |
|---|---|---|---|
| 7,814,420 B2 | 10/2010 | Gerhart et al. | |
| 7,836,102 B2 | 11/2010 | Singh | |
| 8,024,660 B1 | 9/2011 | Quinn et al. | |
| 8,099,664 B2 | 1/2012 | Kureshy et al. | |
| 8,151,192 B2 | 4/2012 | Black et al. | |
| 8,307,341 B2 | 11/2012 | Eykholt | |
| 8,386,932 B2* | 2/2013 | Shewchuk | G06F 8/427 715/705 |
| 2002/0059314 A1* | 5/2002 | Yoneyama | G06F 8/30 |
| 2004/0216052 A1* | 10/2004 | Methot | G06F 9/4446 715/705 |
| 2004/0250175 A1* | 12/2004 | Draine | G06F 11/3664 714/46 |
| 2005/0268234 A1* | 12/2005 | Rossi, Jr. | G06F 9/4446 715/705 |
| 2006/0143593 A1* | 6/2006 | Caffrey | G06F 9/4446 717/120 |
| 2007/0220429 A1* | 9/2007 | Kureshy | G06F 9/4446 715/708 |
| 2007/0277104 A1 | 11/2007 | Hennum et al. | |
| 2008/0172612 A1* | 7/2008 | Allen et al. | 715/708 |
| 2009/0164900 A1* | 6/2009 | Shewchuk | G06F 8/427 715/714 |
| 2009/0183066 A1 | 7/2009 | Crawford et al. | |
| 2010/0146483 A1* | 6/2010 | Komarov | G06F 8/73 717/120 |
| 2013/0041874 A1* | 2/2013 | Dohm | G06F 17/30902 707/705 |
| 2014/0019937 A1* | 1/2014 | Clark | G06F 8/73 717/123 |

OTHER PUBLICATIONS

Sleeter, M., OpenDoc—building online help for a component-oriented architecture, Proceedings of the 14th annual international conference on Systems documentation, 1996, pp. 87-94, [retrieved on Jun. 23, 2016], Retrieved from the Internet: <URL:http://dl.acm.org/>.* http://en.wikipedia.org/wiki/Context-sensitive_help, Wikipedia, last modified Mar. 14, 2013 (1 pp.).

http://en.wikipedia.org/wiki/Tooltip, Wikipedia, last modified Feb. 27, 2013 (2 pps.).

Jhoney et al., "Method to Generate Dynamic Customized Context-Sensitive Help", U.S. Appl. No. 14/012,181, filed Aug. 28, 2013.

Patent Cooperation Treaty PCT, International Search Report, Written Opinion, and Transmittal, International Application No. PCT/CN2014/084793, Nov. 19, 2014, pp. 1-13.

Lee, William, ""?": A Context Sensitive Help System based on Hypertext", Proceedings of the 24th ACM/IEEE Automation Conference, 1987, pp. 429-435, © 1987 ACM 0738-100X/87/0600-0429.

Sleeter, Melissa, E., "OpenDoc—Building Online Help for a Component-Oriented Architecture", SIGDOC '96, pp. 87-94, © 1996 ACM 0-89-791-799-5/96/0087.

* cited by examiner

METHOD TO GENERATE DYNAMIC CUSTOMIZED CONTEXT-SENSITIVE HELP

FIELD OF THE INVENTION

The present invention relates generally to the field of computer software help systems, and more particularly to customizing context-sensitive help screens.

BACKGROUND OF THE INVENTION

At a time when computer systems are getting more and more complex, the old paper manuals have disappeared for most software products. In their place are the built-in help systems, which can provide help content to all users on demand quickly and efficiently. The built-in help systems for today's computer software products and applications include standard help screens and context-sensitive help screens. The standard help screens have a table of contents or index, and are searchable by topic so you can find information about a specific topic at any time. The context-sensitive help screens provide information to a user based on the operation currently being performed in a software product at the time the request for help is made. The request for help may be initiated by the user, or may be triggered by a current problem within the computer software product or computer system.

Context-sensitive help screens may sometimes provide instructions for commands which require some understanding of the environment in which the computer software product is operating. Generic variables for environment information such as server names, or hard disk paths act as placeholders for the actual values from the software environment. The user then has to replace these variables with the actual values from the software environment before use. If the user experiences difficulty understanding the variables or finding the actual values to insert, the user typically has to call for technical support, at the cost of system downtime. Often, the technical support person does not have these actual values either, and the user is walked through finding the information.

SUMMARY

Embodiments of the present invention disclose a method, computer program product, and system for customizing help screens. A computer receives a request for help content. The computer identifies an annotated help file that corresponds to the request for help content. The computer identifies one or more variables in the identified annotated help file. The computer retrieves a value for each of the one or more variables from a software product. The computer replaces each of the one or more variables in the identified annotated help file with the retrieved value to generate a customized help content.

DETAILED DESCRIPTION

As computer software products and applications become more and more complex, creating relevant help systems becomes more important, and can provide a competitive edge over the competition. Embodiments of the present invention recognize the content available in help systems for software products are written generically so they cover the software system regardless of system hardware or software environment. Further, some help content uses generic values to refer to environment specific values, such as hard disk paths, server names, and port configurations. A user must therefore know these environment specific values, or know how to find them. The user then needs to know how to insert them into any commands detailed within the help content. Embodiments of the present invention allow these environment specific fields to be marked or annotated in the help files during product development. Later, when a request for help content is received, the actual environment values are retrieved from the software product, and the help content is dynamically written to replace the annotated fields with the actual environment values in a customized context-sensitive help screen. The help documentation is now put into the context of the present installation. Commands may be simply copied and pasted from the documentation for use without further editing, making the job of the administrator more efficient. Embodiments of the present invention may reduce requests for technical support regarding configuration issues stemming from the increased number of applications in a customer environment and their interactions with each other. Implementation of embodiments of the invention may take a variety of forms, and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Implementation of embodiments of the invention may take a variety of forms, and exemplary implementation details are discussed subsequently with reference to the Figures. The embodiment illustrated in the Figures describes the interaction of a software product help system and annotated help files. Specific details disclosed herein are not to be interpreted as limiting, but merely as a representative basis for teaching one skilled in the art to variously employ the methods and structures of the present disclosure. Embodiments of the present invention may apply to all help system types, including but not limited to help screens within computer software products, online help hosted on a web server, and help screens from a command line interface or other GUI screens.

Figure 1:
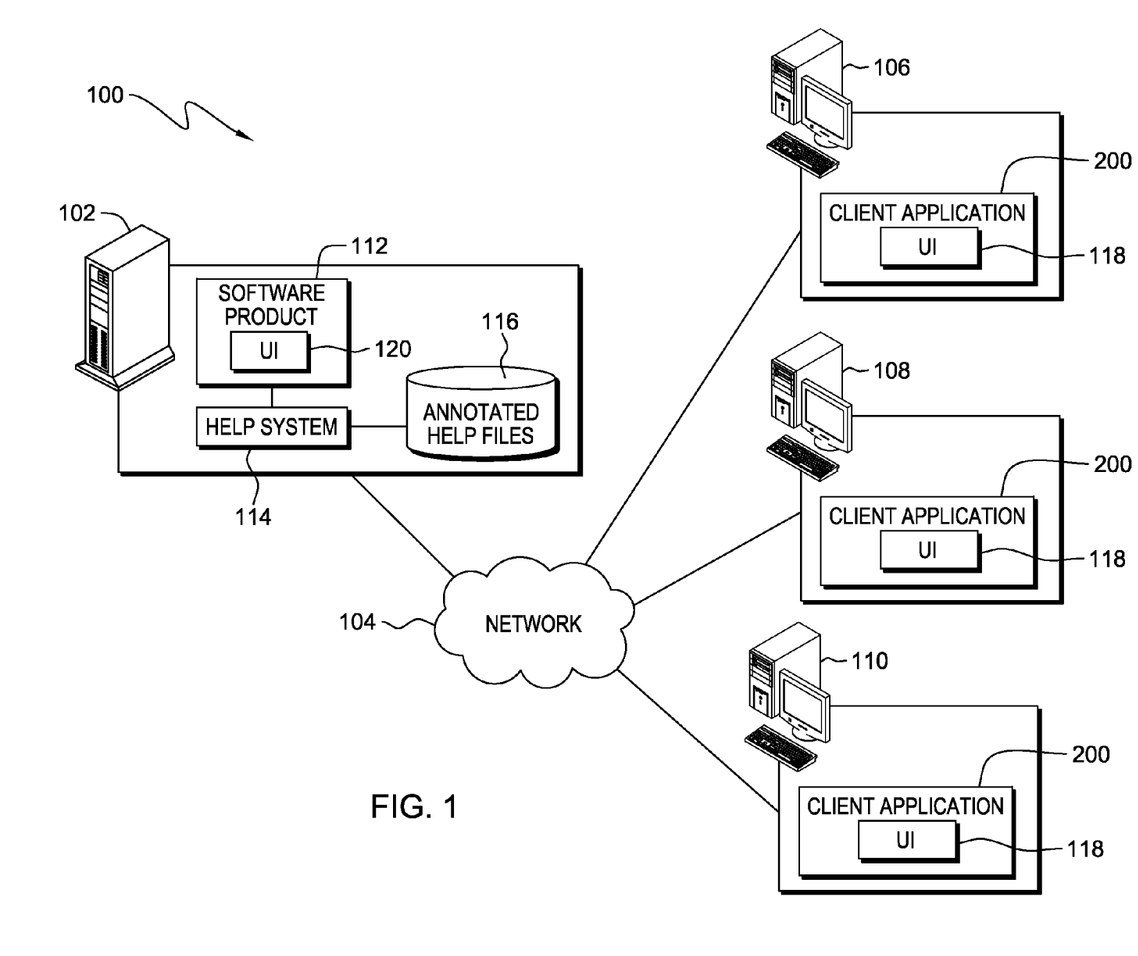
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. Distributed data processing environment 100 includes server computer 102, and client computers 106, 108, and 110, interconnected over network 104.

Server computer 102 may be a specialized server computer, a laptop computer, a tablet computer, a netbook computer, a personal computer (PC), a desktop computer, a personal digital assistant (PDA), a smart phone, or any programmable electronic device capable of communicating with client computers 106, 108, and 110 via network 104. In certain embodiments, server computer 102 represents a computer system utilizing clustered computers and components that act as a single pool of seamless resources when accessed through network 104, as is common in data centers and with cloud computing applications. In general, server computer 102 is representative of any programmable electronic device or combination of programmable electronic devices capable of executing machine-readable program instructions and communicating with other computing devices via a network. Exemplary components of server computer 102 are described in greater detail with regard to FIG. 4.

In various embodiments of the present invention, client computers 106, 108, and 110 can each respectively be a laptop computer, a tablet computer, an application server, a netbook computer, a personal computer (PC), a desktop computer, a personal digital assistant (PDA), a smartphone, or any programmable electronic device capable of communicating with server computer 102 via network 104.

Network 104 can be, for example, a local area network (LAN), a wide area network (WAN) such as the Internet, or a combination of the two, and can include wired, wireless, or fiber optic connections. In general, network 104 can be any combination of connections and protocols that may support communications between server computer 102 and client computers 106, 108, and 110.

In this embodiment, client computers 106, 108, and 110 each respectively include an instance of client application program 200, which executes locally on the respective client computer and has the ability to connect to software product 112 on server computer 102. In the depicted environment, client application program 200 uses user interface 118 to receive user input, and to output responses to a user. User interface 118 may utilize a web page application, a command line processor application, or any other graphical user interface (GUI). Client application program 200 sends information to and receives information from server computer 102 over network 104. Client application program 200 connects to software product 112 in order to perform some function or task inside distributed data processing environment 100. Client application program 200 may be any program capable of connecting to software product 112 and requesting software product 112 to perform some task. Client application program 200 may be an associated client application created by the vendor or developer of software product 112 for use in a server-client environment.

Server computer 102 includes user interface 120, software product 112, help system 114, and annotated help files 116. User interface 120 may utilize a web page, command line processor, or any other GUI to connect to software product 112. In the depicted environment, software product 112 uses user interface 120 to receive user input, and to output responses to a user, such as a system administrator. Over network 104, server computer 102 may receive a request for help content from client application program 200 running on a client computer, i.e., client computers 106, 108, or 110. Additionally a request for help content may come from within software product 112 running on server computer 102. Software product 112 passes the request for help content to help system 114. Help system 114 processes the request by identifying the corresponding help document residing in annotated help files 116, customizing the identified annotated help file with information from software product 112 or environment configuration files, and sending the customized help content associated with the request back to the originating requestor, i.e., client application program 200 or software product 112.

In the illustrative embodiment of FIG. 1, help system 114, and annotated help files 116 are on server computer 102 with software product 112. In another embodiment of the present invention, help system 114, annotated help files 116, and software product 112 may be on more than one computer, and each item itself may be split into a plurality of parts and spread across more than one computer. In any configuration, the following is maintained: help system 114 is connected to annotated help files 116, and to software product 112. Help system 114 may be fully integrated, partially integrated or completely separate from software product 112 and client application program 200. Help system 114 may include, but is not limited to, a help system technology, such as Eclipse Platform help system, Eclipse Information Center (infocenter), or UNIX™ man (manual) pages. In another embodiment of the present invention, help system 114 may serve more than one software product in an installation, wherein each software product has a respective set of annotated help files. In another embodiment of the present invention, help system 114 may be an online web application that is hosted remotely outside of the installation environment of software product 112, and utilizes annotated help files 116 which may be either on the web server or inside the installation environment. Help system 114 is described further in FIG. 2.

Figure 2:
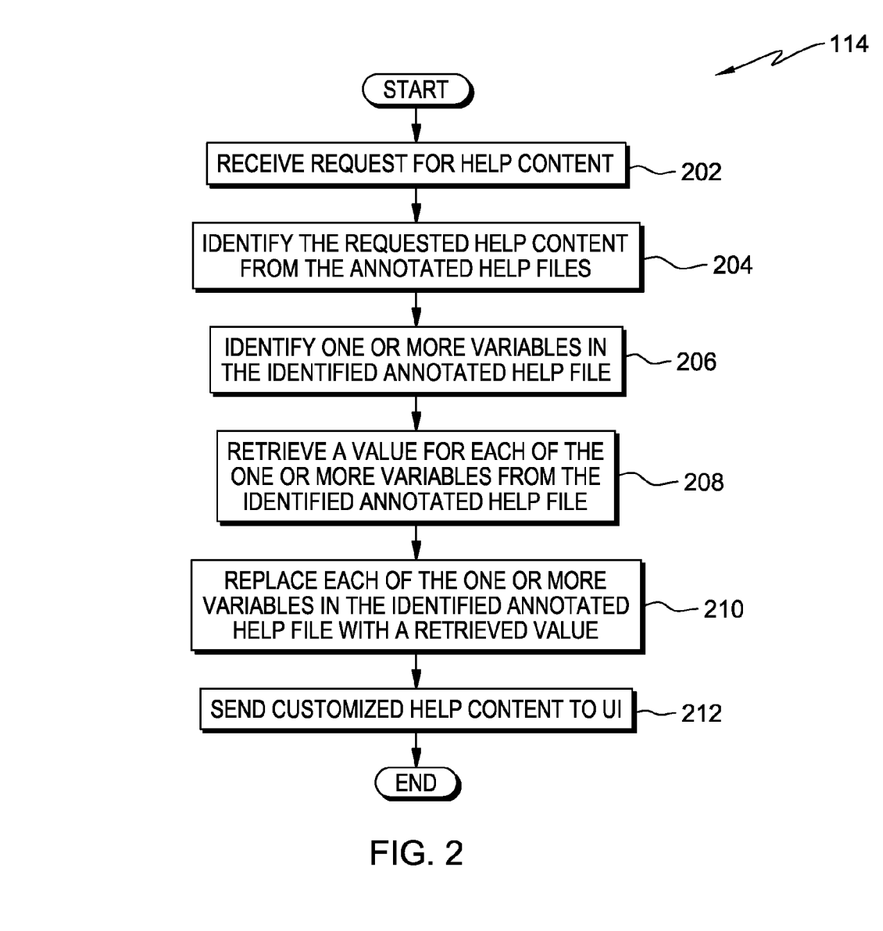
FIG. 2 is a flowchart depicting the operational steps of a customized context-sensitive help system, in accordance with an embodiment of the present invention.

FIG. 2 is a flowchart depicting the operational steps of a customized context-sensitive help system, help system 114, in accordance with an embodiment of the present invention. In a preferred embodiment, help system 114 includes the capability to specify replacement of select fields within annotated help files 116 with environment specific values.

Help system 114 receives a request for help content (step 202). Help system 114, running on server computer 102, receives a request for help content from a user. In one embodiment, help system 114 receives the request for help content over network 104 from client application program 200 running on a client computer, i.e., client computer 106, 108, or 110. Client application program 200 receives the request for help content from a user through user interface 118. In another embodiment, help system 114 receives the request for help content from software product 112 running on server computer 102. Software product 112 receives the request for help content from a user through user interface 120. In both cases, a user inputs a request for help content through a user interface. The user may initially click on a help button or select a help menu item to get to an initial help screen from help system 114. From the initial standard screen, a user may select a topic from an index list or table of contents, or search for a topic using a search function. It may take several selections, drilling down through levels of topics, before a topic of interest is identified. Each time the user clicks on a link for a topic, a request for help content is created and sent to help system 114. For example, a user wants to configure a new software product to connect to a DB2 database. The user would start the help system, and make the following selections inside the table of contents: click on the software product name, within that topic click on the topic "Configuring", within that topic click on the topic "Configuring database connection", and within that topic click on topic "Connecting to a DB2 database". At this point, the user has found the topic of interest. On each click, a web page may be displayed to the right of the contents list, which may or may not contain annotated variables that have been replaced with actual values. Not every help page contains these variables, but the ones that do will require the replacement of the variables with actual values before it is displayed to the user.

In another embodiment, software product 112 creates the request for help content in response to an error while performing some task, and then sends the request for help content to help system 114. For example, a person using a laptop computer in a business environment may use client application program 200 on their laptop to connect to a server application, such as software product 112, for requesting a task of data storage. Software product 112 may have an error while writing to a hardware device when performing the task of data storage. Subsequent to the error, software product 112 may create a request for help content that identifies a topic of interest based on the error, for example, problems with data storage from a client computer. In response to some error codes, a help document detailing the location of certain error logs may be presented so the customer can send the log to outside technical support. The location of the error log is an annotation that gets filled in with the actual environment values. A person of ordinary skill in the art will recognize there are other ways in which requests for help content may be received.

In step 204, help system 114 identifies the requested help content from annotated help files 116. Help system 114 receives the request for help content that includes a topic of interest. Help system 114 identifies the requested help document from within annotated help files 116, such that the identified annotated help file matches the topic of interest in the request for help content. The "identified annotated help file", as used herein, is denoted in the singular form, but may actually be a collection of files that form the output screen. The product developers of both software product 112 and help system 114 prepare the annotated help files 116. The product developers create a plurality of help documentation files within annotated help files 116 with special annotations that denote variables within the help content. These context specific variables are related to configuration and environment specific values, such as server names and profile root directories, and are known to the product team at time of development.

In step 206, help system 114 identifies one or more variables in the identified annotated help file. The identified annotated help file from step 204 is scanned for variables. Each identified annotated help file may hold one or more variables, and may include multiple instances of a single variable. The variable corresponds to an environment specific value including, but not limited to, a hard disk path, a server name, or a port configuration. The values for these variables are defined during installation of software product 112.

In step 208, help system 114 retrieves a value for each of the one or more variables from the identified annotated help file. Help system 114 interfaces with software product 112 to retrieve the actual values of the one or more variables identified in step 206. The interface provides two-way communication between help system 114 and software product 112. Help system 114 sends a request to software product 112 for the values of the variables. Software product 112 queries the registry or other configuration files to retrieve the values for all of the variables in the help content. Software product 112 sends the values of the variables to help system 114. Help system 114 receives the values of the variables. The interface is an application programming interface (API), which is written by the developers of both software product 112 and help system 114. In another embodiment of the present invention, the interface may be a Representational State Transfer (REST) interface, or any other interface architecture known in the art.

In step 210, help system 114 replaces each of the one or more variables in the identified annotated help file with a retrieved value. For each of the one or more variables identified in the identified annotated help file, the variable is replaced with the actual value retrieved in step 208. This temporary version of the identified annotated help file becomes a dynamically generated customized context-sensitive help document. This does not change the stored repository of help documentation. If the environment configuration changes, the dynamically generated customized context-sensitive help documents will adjust accordingly and remain effective. In an embodiment of the present invention, the values inserted in the dynamically generated customized context-sensitive help document may be highlighted, underlined, or marked in some fashion to inform the user that the text was a variable. In another embodiment of the present invention, annotated help files 116 as a whole may be customized with actual values and saved for use by software product 112. In this case, if the installation environment changes, a new customized version of annotated help files 116 would have to be recreated with the new values for the variables.

In step 212, help system 114 sends customized help content to user interface (UI). In the preferred embodiment of the present invention, help system 114 sends the dynamically generated customized help content to the requestor. Client application program 200 sends the received customized help content to the user through user interface 118. Software product 112 sends the received customized help content to the user through user interface 120. In the case where software product 112 generated the request in response to an error, the customized help content will be sent to the appropriate user. The customized help content may be in the form of html pages, PDF files, information center web pages, or other types of web pages available to one skilled in the art. Customized help content may also be delivered in pop-up windows, or command line windows. A person of ordinary skill in the art will recognize that there are other ways in which the response may be formatted or transmitted to the user.

Help system 114 may repeat steps 202 through 212 for as long as the user requires it.

Figure 3A:
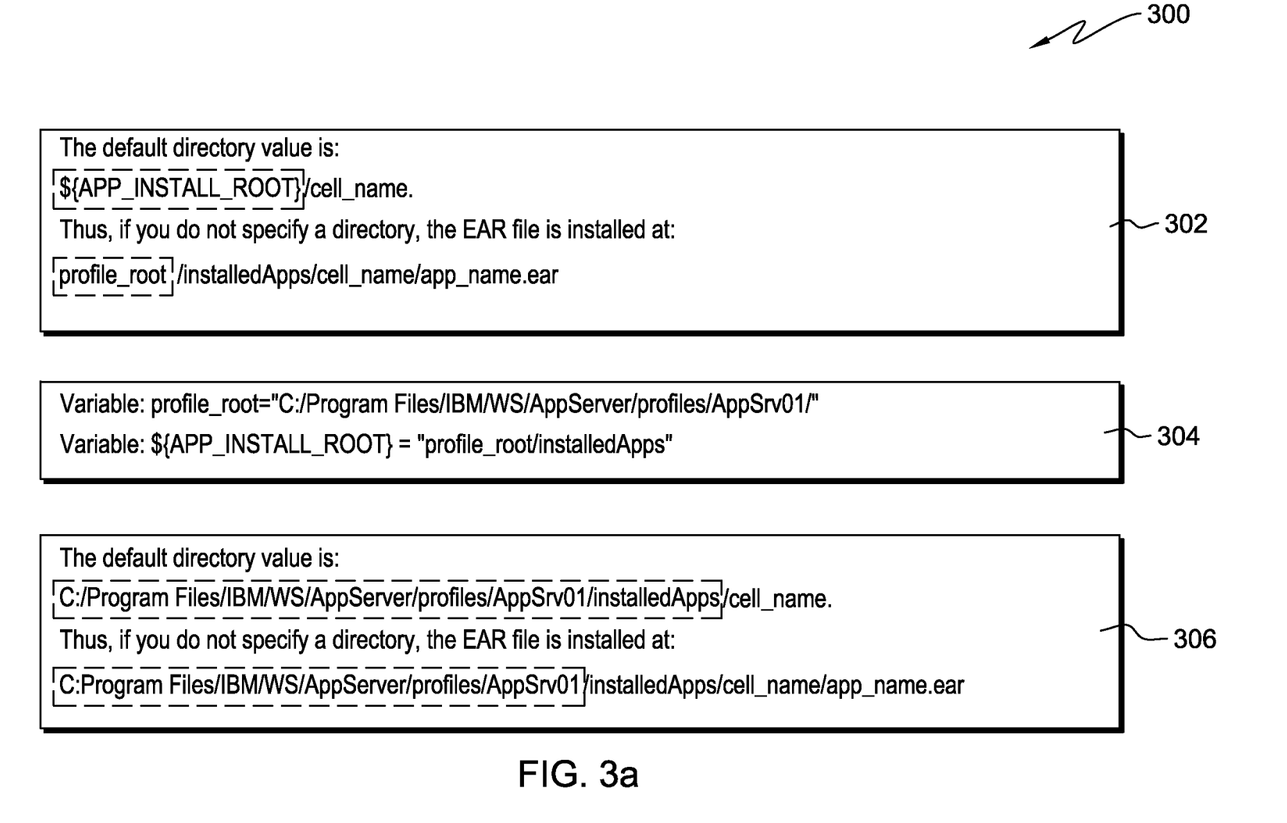
FIG. 3a is a block diagram of an example of a customized context-sensitive help output, in accordance with an embodiment of the present invention.

FIG. 3a is a block diagram of an example of a customized context-sensitive help output, in accordance with an embodiment of the present invention. Help content example 300 is an example of values for variables pulled from environment specific path values.

Block 302 shows an example of annotated help content which includes variables. In block 302, the boxed items, "${APP_INSTALL_ROOT}" and "profile_root", are annotated variables in the help content.

Block 304 is an example of two variables and the associated actual values. Inside block 304, variable "profile_root"="C:/Program Files/IBM/WS/AppServer/profiles/AppSrv01/" and variable "${APP_INSTALL_ROOT}"="profile_root/installedApps". In this case, one variable includes another variable within it.

Block 306 shows the customized help content after the variables have been replaced with actual values. The help content has been customized with the environment specific information, shown as boxed items, and is ready to be sent to the user. This is an illustrative example, and is not intended to be limiting.

Figure 3B:
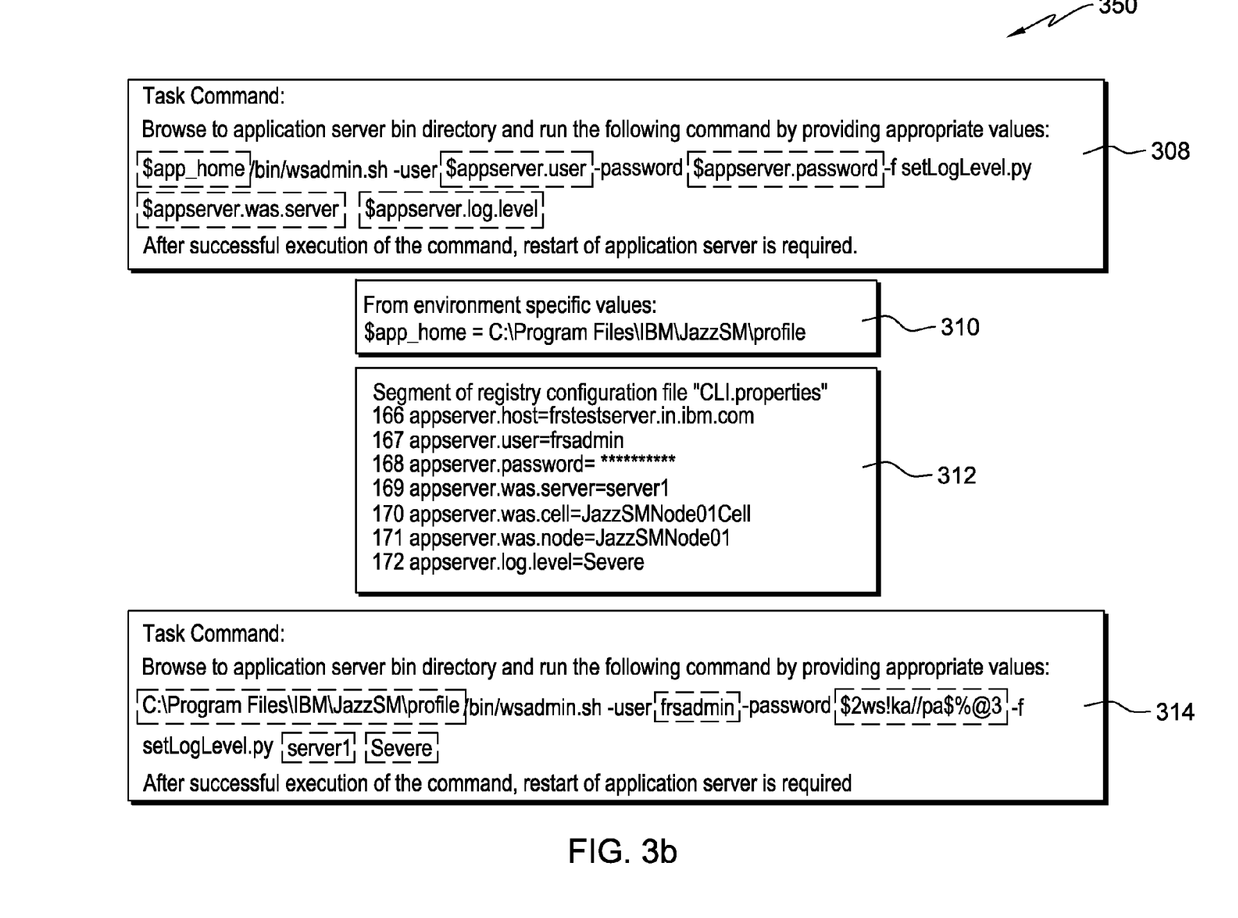
FIG. 3b is a block diagram of an example of a customized context-sensitive help output, in accordance with an embodiment of the present invention.

FIG. 3b is a block diagram of an example of a customized context-sensitive help output, in accordance with an embodiment of the present invention. Help content example 350 is an example of values for variables pulled from a registry configuration file and from environment specific path values.

Block 308 shows an example of annotated help content which includes variables. In block 308, the boxed items, "app_home", "$appserver.user", "$appserver.password", $appserver.was.server" and "$appserver.log.level", are annotated variables in the help content.

Block 310 is an example of five variables and the associated actual values. Inside block 310, variable "app_home"="C:/Program Files/IBM/JazzSM/profile" comes from environment path information. The remaining variables come from defined variables inside a registry configuration file named "CLI.properties". Variable "$appserver.user"="frsadmin". Variable "$appserver.password"="$2ws!ka//pa$%@3". Variable "$appserver.was.server"="server1". Variable "$appserver.log.level"="Severe". In this case, values for variables are being pulled from two locations by help system 114 and software product 112. Help system 114 requests the values of the variables from software product 112 through an interface. Software product 112 then queries the registry or other configuration files to retrieve the values for all of the variables in the help content.

Block 314 shows the customized help content after the variables have been replaced with actual values. The help content has been customized with the actual values, shown as boxed items, and is ready to be sent to the user. This is an illustrative example, and is not intended to be limiting. Many more variables and variables of different types may exist in an annotated help file.

An exemplary list of variables and environment configuration items pulled out from the product environment follows: (1) path and environment variables retrieved from a product environment variables list (i.e. ITM_HOME=/opt/IBM/ITM), e.g., %ITM_HOME%, %CANDLE_HOME%, %OMNI_HOME%, %HOST_NAME% etc-%ITM_HOME%; (2) server level parameter values retrieved from product configuration files, e.g., %SERVER_NAME%, %OS_ARCH%, %CELL_NAME%, %NODE_NAME%, %APPSERVER_HOME%; (3) application user-level parameters retrieved from product configuration files, e.g., %PORT%, %LOG_LEVEL%, %TRACE_LEVEL%, %USER_NAME%; and (4) database level parameter values retrieved from a services file and database configuration files, e.g., %THREAD_POOLS%, %DATABASE_USER%, %DATABASE_INSTANCE_NAME%, %DATABASE_PORT%, %JDBC_CONNECTION_TIMEOUT%. The preferred embodiment of the present invention uses at least one of the above variables and variable types in customizing help content.

Figure 4:
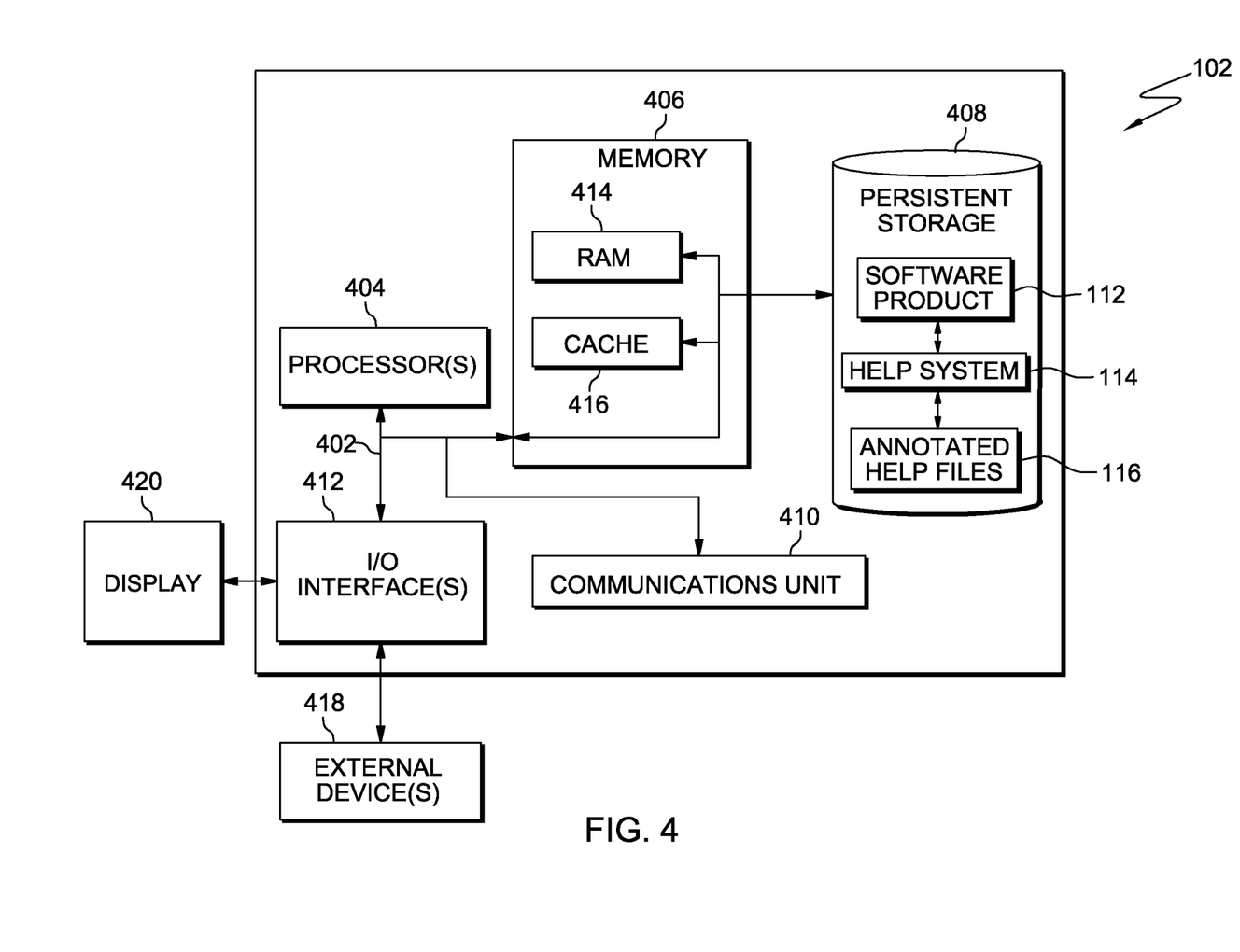
FIG. 4 depicts a block diagram of components of an exemplary computer system for implementing embodiments of the present invention.

FIG. 4 depicts a block diagram of components of server computer 102 in accordance with an illustrative embodiment of the present invention. It may be appreciated that FIG. 4 provides only an illustration of one implementation and does not imply any limitations with regard to the environments in which different embodiments may be implemented. Many modifications to the depicted environment may be made.

Server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Help system 114, software product 112, and annotated help files 116 are stored in persistent storage 408 for execution and/or access by one or more of the respective computer processors 404 via one or more memories of memory 406. Help system 114 has access to both software product 112 and annotated help files 116. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of server computer 102 and client computers 106, 108, and 110. In these examples, communications unit 410 includes one or more network interface cards. Communications unit 410 may provide communications through the use of either or both physical and wireless communications links. Help system 114, software product 112, and annotated help files 116 may be downloaded to persistent storage 408 through communications unit 410.

I/O interface(s) 412 allows for input and output of data with other devices that may be connected to server computer 102. For example, I/O interface 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., help system 114, software product 112, and annotated help files 116 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for customizing help content, the method comprising:

a computer receiving a request for help content, wherein the request for help content is received after an error is encountered while performing a task with a software product, the request for help content identifying a topic of interest based on the error;

the computer identifying an annotated help file that corresponds to the request for help content;

the computer identifying a plurality of variables in the identified annotated help file, wherein at least a first variable of the plurality of variables includes another variable of the plurality of variables within the first variable;

the computer retrieving a value for each of the plurality of variables from the software product, wherein the software product queries resources to obtain the value for each of the plurality of variables, wherein the retrieved values include at least two distinct values each of which is a server level parameter value retrieved from a product configuration file, an application user-level parameter value retrieved from a product configuration file, a database level parameter value retrieved from a services file, or a database level parameter value retrieved from a database configuration file; and the computer replacing each of the plurality of variables in the identified annotated help file with the retrieved value to generate a customized help content.

2. The method of claim 1, wherein the annotated help file is annotated with variables for environment and configuration values.

3. The method of claim 1, the method further comprising:
the computer creating an interface between the software product and a help system to provide two-way communication between the software product and the help system.

4. The method of claim 3, wherein the help system that is connected to the software product, is further connected to a plurality of annotated help files.

5. The method of claim 4, wherein the help system exists as an online application hosted remotely outside an installation environment of the software product.

6. The method of claim 1, wherein the retrieved values include a port configuration.

7. The method of claim 6, wherein the retrieved values further include a hard disk path.

8. The method of claim 7, wherein the retrieved values further include a server name.

* * * * *